US012803444B2

(12) United States Patent
Yi et al.

(10) Patent No.: US 12,803,444 B2

(45) Date of Patent: Nov. 17, 2026

(54) DC-DC CONVERTER WITH BOOTSTRAP CAPACITOR CHARGING CONTROL, CHIP, AND ELECTRONIC DEVICE

(71) Applicant: SG MICRO CORP, Beijing (CN)

(72) Inventors: Xinmin Yi, Beijing (CN); Xiaolin Liu, Beijing (CN)

(73) Assignee: SG MICRO CORP, Beijing (CN)

(*) Notice: Subject to any disclaimer, the term of this patent is extended or adjusted under 35 U.S.C. 154(b) by 109 days.

(21) Appl. No.: 18/879,834

(22) PCT Filed: May 29, 2024

(86) PCT No.: PCT/CN2024/095881

§ 371 (c)(1), (2) Date: Dec. 30, 2024

(87) PCT Pub. No.: WO2024/245253

PCT Pub. Date: Dec. 5, 2024

(65) Prior Publication Data

US 2025/0385609 A1 Dec. 18, 2025

(30) Foreign Application Priority Data

May 30, 2023 (CN) ........................ 202310628104.6

(51) Int. Cl.
*H02M 3/158* (2006.01)

(52) U.S. Cl.
CPC .................................. *H02M 3/158* (2013.01)

(58) Field of Classification Search
CPC .......................................... H02M 3/155-1588
See application file for complete search history.

(56) References Cited

U.S. PATENT DOCUMENTS

2005/0201186 A1* 9/2005 Yamazaki .......... G11C 11/4085 365/230.06
2009/0103341 A1* 4/2009 Lee ...................... B60W 10/26 320/140
2024/0030812 A1* 1/2024 D'Souza ................ H02M 1/08

FOREIGN PATENT DOCUMENTS

| | | | |
|---|---|---|---|
| CN | 101944904 | A | 1/2011 |
| CN | 112311211 | A | 2/2021 |
| CN | 114268219 | A | 4/2022 |
| CN | 117134611 | A | 11/2023 |
| JP | 2007195361 | A | 8/2007 |

* cited by examiner

*Primary Examiner* — Peter M Novak
(74) *Attorney, Agent, or Firm* — Bayramoglu Law Offices LLC

(57) ABSTRACT

A Direct Current (DC)-DC converter, a chip, and an electronic device are provided. The DC-DC converter includes an upper power transistor, a lower power transistor, an inductor, a bootstrap capacitor, a first transistor, a charging control circuit, a drive control circuit, and a driver circuit. Both ends of the bootstrap capacitor are respectively coupled to a first node and a first electrode of the first transistor. The charging control circuit is configured to generate a charging control voltage according to a Pulse Width Modulation (PWM) signal. When the PWM signal is at a first level, the charging control voltage is set to a voltage at the first electrode of the first transistor, and when the PWM signal is at a second level, the charging control voltage is set to a voltage at the first node. A control electrode of the first transistor is provided with the charging control voltage.

16 Claims, 5 Drawing Sheets

DC-DC CONVERTER WITH BOOTSTRAP CAPACITOR CHARGING CONTROL, CHIP, AND ELECTRONIC DEVICE

CROSS-REFERENCE TO THE RELATED APPLICATIONS

This application is the national phase entry of International Application No. PCT/CN2024/095881, filed on May 29, 2024, which is based upon and claims priority to Chinese Patent Application No. 202310628104.6, filed on May 30, 2023, the entire contents of which are incorporated herein by reference.

TECHNICAL FIELD

The present disclosure relates to the technical field of integrated circuits, and in particular to a Direct Current (DC)-DC converter, a chip, and an electronic device.

BACKGROUND

DC-DC converters are often used to convert DC voltages in various electronic devices. The DC-DC converter includes a buck converter (BUCK) and a boost converter (BOOST). The buck converter may convert a higher DC voltage into a lower DC voltage. The boost converter may convert a lower DC voltage into a higher DC voltage. In applications with wide input and output ranges, if an input voltage or an output voltage is too high, an upper power transistor may be mistakenly turned off. In order to avoid this problem, a bootstrap capacitor is usually required to keep the upper power transistor turned on.

SUMMARY

Embodiments described in the present disclosure provide a DC-DC converter, a chip, and an electronic device.

According to a first aspect of the present disclosure, a DC-DC converter is provided. The DC-DC converter includes an upper power transistor, a lower power transistor, an inductor, a bootstrap capacitor, a first transistor, a charging control circuit, a drive control circuit, and a driver circuit. The driver circuit is configured to generate an upper transistor on signal and a lower transistor on signal according to a drive control signal output by the drive control circuit. When the drive control signal is at a first level, the upper transistor on signal is at an active level and the lower transistor on signal is at an inactive level. When the drive control signal is at a second level, the upper transistor on signal is at the inactive level and the lower transistor on signal is at the active level. A control electrode of the upper power transistor is provided with the upper transistor on signal. A control electrode of the lower power transistor is provided with the lower transistor on signal. A first electrode of the upper power transistor is coupled to a second electrode of the lower power transistor and a first end of the inductor through a first node. Both ends of the bootstrap capacitor are respectively coupled to the first node and a first electrode of the first transistor. The charging control circuit is configured to generate a charging control voltage according to a Pulse Width Modulation (PWM) signal. When the PWM signal is at the first level, the charging control voltage is set to a voltage at the first electrode of the first transistor, and when the PWM signal is at the second level, the charging control voltage is set to a voltage at the first node. A control electrode of the first transistor is provided with the charging control voltage. A second electrode of the first transistor is coupled to a charging voltage end. The drive control circuit is configured to determine an on-off state of the first transistor according to the charging control voltage, and cause the drive control signal to be at the first level in a case where the PWM signal is at the first level and the first transistor is completely turned off, otherwise cause the drive control signal to be at the second level.

In some embodiments of the present disclosure, the drive control circuit includes a turn-off determination circuit and a control signal output circuit. The turn-off determination circuit is configured to output a turn-off indication signal at the active level when the charging control voltage is greater than or equal to a reference voltage, otherwise output the turn-off indication signal at the inactive level. The active level of the turn-off indication signal indicates that the first transistor is completely turned off, and the reference voltage is set according to a threshold voltage of the first transistor. The control signal output circuit is configured to output the drive control signal at the first level when the PWM signal is at the first level and the turn-off indication signal is at the active level, otherwise output the drive control signal at the second level.

In some embodiments of the present disclosure, the turn-off determination circuit includes a voltage comparator. A first input end of the voltage comparator is coupled to the control electrode of the first transistor. A second input end of the voltage comparator is coupled to a reference voltage end. The reference voltage is output from the reference voltage end. An output end of the voltage comparator is coupled to the control signal output circuit.

In some embodiments of the present disclosure, the turn-off determination circuit includes a Schmitt trigger and a first level conversion circuit. An input end of the Schmitt trigger is coupled to the control electrode of the first transistor. An upper threshold of the Schmitt trigger is set to the reference voltage. The Schmitt trigger is configured to generate a trigger signal according to the charging control voltage. The trigger signal is inverted to a third level when the charging control voltage rises to the reference voltage, and is inverted to a fourth level when the charging control voltage drops to a lower threshold. The lower threshold is lower than the reference voltage. The first level conversion circuit is configured to generate the turn-off indication signal according to the trigger signal. The third level of the trigger signal is converted to the active level of the turn-off indication signal, and the fourth level of the trigger signal is converted to the inactive level of the turn-off indication signal.

In some embodiments of the present disclosure, the control signal output circuit includes an AND gate. A first input end of the AND gate is provided with the turn-off indication signal. A second input end of the AND gate is provided with the PWM signal. The drive control signal is output from an output end of the AND gate.

In some embodiments of the present disclosure, the charging control circuit includes a second level conversion circuit and a second transistor to a fifth transistor. The second level conversion circuit is configured to convert the first level of the PWM signal to a fifth level, and convert the second level of the PWM signal to a sixth level. A control electrode of the second transistor is coupled to a control electrode of the third transistor and an output end of the second level conversion circuit. A first electrode of the second transistor is coupled to the first electrode of the first transistor and a first electrode of the fourth transistor. A second electrode of the second transistor is coupled to a second electrode of the third transistor, a control electrode of the fourth transistor, and a control electrode of the fifth transistor. A first electrode of the third transistor is coupled to the first node and a first electrode of the fifth transistor. A second electrode of the fourth transistor is coupled to a second electrode of the fifth transistor and the control electrode of the first transistor.

In some embodiments of the present disclosure, both the upper power transistor and the lower power transistor are N-channel Metal Oxide Semiconductor (NMOS) transistors.

In some embodiments of the present disclosure, the first transistor is a P-channel Metal Oxide Semiconductor (PMOS) transistor.

In some embodiments of the present disclosure, a second electrode of the upper power transistor is coupled to one of an input voltage end and an output voltage end. A second end of the inductor is coupled to the other of the input voltage end and the output voltage end.

In some embodiments of the present disclosure, when the second electrode of the upper power transistor is coupled to the input voltage end and the second end of the inductor is coupled to the output voltage end, the DC-DC converter is a buck converter. When the second electrode of the upper power transistor is coupled to the output voltage end and the second end of the inductor is coupled to the input voltage end, the DC-DC converter is a boost converter.

In some embodiments of the present disclosure, an input end of the driver circuit is coupled to an output end of the drive control circuit, a first output end of the driver circuit is coupled to the control electrode of the upper power transistor, and a second output end of the driver circuit is coupled to the control electrode of the lower power transistor. The driver circuit provides the upper transistor on signal for the control electrode of the upper power transistor from the first output end, and the driver circuit provides the lower transistor on signal for the control electrode of the lower power transistor from the second output end.

In some embodiments of the present disclosure, the charging control circuit is coupled to the first node, the first electrode of the first transistor, and the control electrode of the first transistor.

In some embodiments of the present disclosure, a first input end of the drive control circuit is coupled to the control electrode of the first transistor, a second input end of the drive control circuit is provided with the PWM signal, and the output end of the drive control circuit is coupled to the input end of the driver circuit.

In some embodiments of the present disclosure, an input end of the turn-off determination circuit is coupled to the control electrode of the first transistor, and an output end of the turn-off determination circuit is coupled to a first input end of the control signal output circuit. A second input end of the control signal output circuit is provided with the PWM signal, and an output end of the control signal output circuit is coupled to the input end of the driver circuit.

According to a second aspect of the present disclosure, a DC-DC converter is provided. The DC-DC converter includes an upper power transistor, a lower power transistor, an inductor, a bootstrap capacitor, a first transistor to a fifth transistor, a Schmitt trigger, a first level conversion circuit, a second level conversion circuit, an AND gate, and a driver circuit. The driver circuit is configured to generate an upper transistor on signal and a lower transistor on signal according to a drive control signal output from an output end of the AND gate. When the drive control signal is at a first level, the upper transistor on signal is at an active level and the lower transistor on signal is at an inactive level. When the drive control signal is at a second level, the upper transistor on signal is at the inactive level and the lower transistor on signal is at the active level. A control electrode of the upper power transistor is provided with an upper transistor on signal. A control electrode of the lower power transistor is provided with a lower transistor on signal. A first electrode of the upper power transistor is coupled to a second electrode of the lower power transistor and a first end of the inductor through a first node. Both ends of the bootstrap capacitor are respectively coupled to the first node and a first electrode of the first transistor. The second level conversion circuit is configured to convert the first level of a PWM signal to a fifth level, and convert the second level of the PWM signal to a sixth level. A control electrode of the second transistor is coupled to a control electrode of the third transistor and an output end of the second level conversion circuit. A first electrode of the second transistor is coupled to the first electrode of the first transistor and a first electrode of the fourth transistor. A second electrode of the second transistor is coupled to a second electrode of the third transistor, a control electrode of the fourth transistor, and a control electrode of the fifth transistor. A first electrode of the third transistor is coupled to the first node and a first electrode of the fifth transistor. A second electrode of the fourth transistor is coupled to a second electrode of the fifth transistor and a control electrode of the first transistor. A second electrode of the first transistor is coupled to a charging voltage end. The Schmitt trigger is configured to generate a trigger signal according to a charging control voltage at the control electrode of the first transistor. The trigger signal is inverted to a third level when the charging control voltage rises to an upper threshold, and is inverted to a fourth level when the charging control voltage drops to a lower threshold. The lower threshold is lower than the upper threshold. The first level conversion circuit is configured to generate a turn-off indication signal according to the trigger signal. The third level of the trigger signal is converted to the active level of the turn-off indication signal, and the fourth level of the trigger signal is converted to the inactive level of the turn-off indication signal. A first input end of the AND gate is provided with the turn-off indication signal. A second input end of the AND gate is provided with the PWM signal.

According to a third aspect of the present disclosure, a chip is provided. The chip includes the DC-DC converter according to the first aspect or the second aspect of the present disclosure.

According to a fourth aspect of the present disclosure, an electronic device is provided. The electronic device includes the chip according to the third aspect of the present disclosure.

BRIEF DESCRIPTION OF THE DRAWINGS

In order to more clearly illustrate the technical solutions in the present disclosure or the related art, the drawings used in the description of the embodiments or the related art will be briefly described below. It is apparent that the drawings described below are only some embodiments of the present disclosure and not intended to limit the present disclosure. Other drawings may further be obtained by those of ordinary skill in the art according to these drawings without creative efforts.

In the drawings, reference signs with the same last two digits correspond to the same elements. It is to be noted that the elements in the drawings are schematic and not drawn to scale.

DETAILED DESCRIPTION OF THE EMBODIMENTS

In order to make the purpose, technical solutions, and advantages of the embodiments of the present disclosure clearer, the technical solutions in the embodiments of the present disclosure will be described clearly and completely below with reference to the drawings. It is apparent that the described embodiments are part rather than all embodiments of the present disclosure. On the basis of the description of the embodiments of the present disclosure, all other embodiments obtained by those skilled in the art without creative work shall fall within the scope of protection of the present disclosure.

Unless otherwise defined, all terms used herein (including technical and scientific terms) have the same meanings as those commonly understood by those skilled in the art that the subject of the present disclosure belongs. Further, it is to be understood that terms such as those defined in commonly used dictionaries should be interpreted as having the meanings consistent with those in the context of the specification and related technologies, and will not be interpreted in an idealized or overly formal form, unless otherwise defined herein. As used herein, the statement that two or more parts are "connected" or "coupled" together shall mean that these parts are combined directly or through one or more intermediate parts.

In all embodiments of the present disclosure, since a source and a drain of a Metal Oxide Semiconductor (MOS) transistor are symmetrical, and directions of on currents between the sources and the drains of an N-type transistor and a P-type transistor are opposite, in the embodiments of the present disclosure, a controlled middle end of the MOS transistor is referred to as a control electrode, and the remaining two ends of the MOS transistor are referred to as a first electrode and a second electrode, respectively. In addition, for the convenience of unified expression, in the context, a base of a Bipolar Junction Transistor (BJT) is referred to as the control electrode, an emitter of the BJT is referred to as the first electrode, and a collector of the BJT is referred to as the second electrode. In addition, terms such as "first" and "second" are only used for distinguishing one component (or one part of a component) from another component (or another part of a component).

Figure 1:
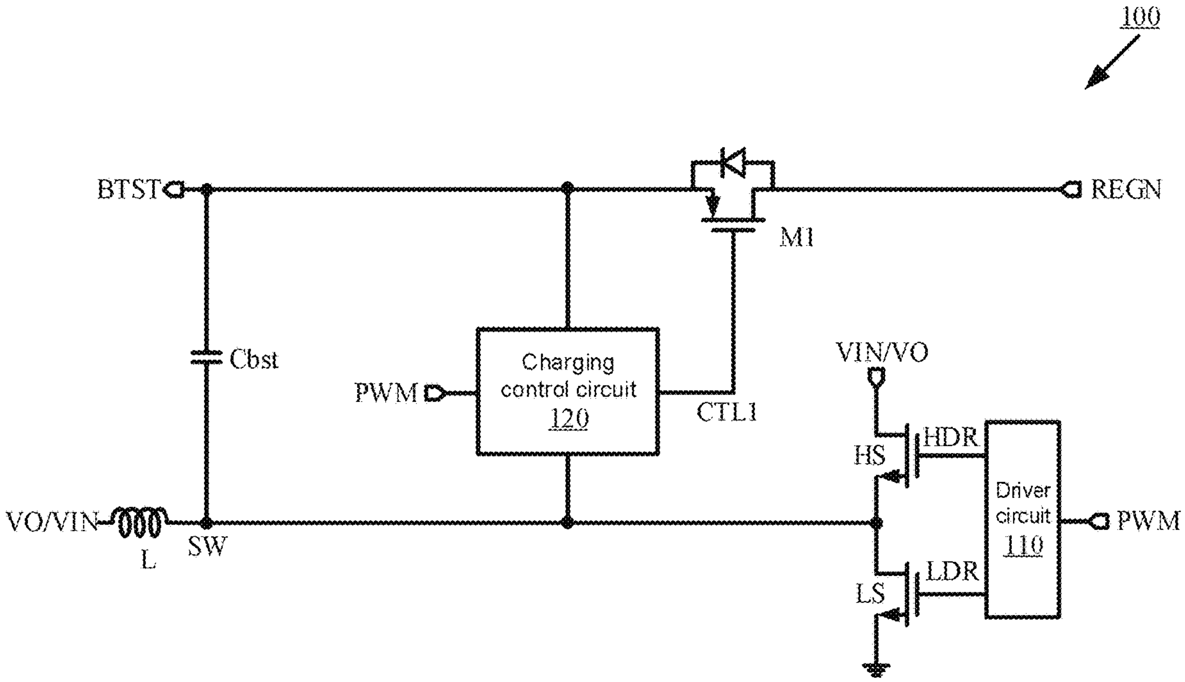
FIG. 1 is an exemplary circuit diagram of a DC-DC converter.

FIG. 1 shows an exemplary circuit diagram of a DC-DC converter 100. The DC-DC converter 100 includes an upper power transistor HS, a lower power transistor LS, an inductor L, a bootstrap capacitor Cbst, a first transistor M1, a charging control circuit 120, and a driver circuit 110. A body diode of the first transistor M1 is also shown in an example of FIG. 1. In order to avoid unimportant details from blurring the focus of the present disclosure, all components in the DC-DC converter 100 are not shown in FIG. 1. In the example of FIG. 1, both the upper power transistor HS and the lower power transistor LS are NMOS transistors. The first transistor M1 is a PMOS transistor.

The driver circuit 110 is configured to generate an upper transistor on signal HDR and a lower transistor on signal LDR according to a PWM signal. The PWM signal may be generated by a logic control circuit in the DC-DC converter 100 according to an output voltage VO and a reference voltage, and the logic control circuit is not shown in the example of FIG. 1. When the PWM signal is at a first level, the upper transistor on signal HDR is at an active level and the lower transistor on signal LDR is at an inactive level. When the PWM signal is at a second level, the upper transistor on signal HDR is at the inactive level and the lower transistor on signal LDR is at the active level.

A control electrode of the upper power transistor HS is provided with the upper transistor on signal HDR. A control electrode of the lower power transistor LS is provided with the lower transistor on signal LDR. A first electrode of the upper power transistor HS is coupled to a second electrode of the lower power transistor LS and a first end of the inductor L through a first node SW. A first electrode of the lower power transistor LS is grounded. A second electrode of the upper power transistor HS is coupled to one of an input voltage end VIN and an output voltage end VO. A second end of the inductor L is coupled to the other of the input voltage end VIN and the output voltage end VO. In an example where the second electrode of the upper power transistor HS is coupled to the input voltage end VIN and the second end of the inductor L is coupled to the output voltage end VO, the DC-DC converter 100 is a buck converter (BUCK). In an example where the second electrode of the upper power transistor HS is coupled to the output voltage end VO and the second end of the inductor L is coupled to the input voltage end VIN, the DC-DC converter 100 is a boost converter (BOOST).

Both ends of the bootstrap capacitor Cbst are respectively coupled to the first node SW and a first electrode (bootstrap node BTST) of the first transistor M1.

The charging control circuit 120 is configured to generate a charging control voltage CTL1 according to the PWM signal. When the PWM signal is at the first level, the charging control voltage CTL1 is set to a voltage at the first electrode of the first transistor M1, and when the PWM signal is at the second level, the charging control voltage CTL1 is set to a voltage at the first node SW.

A control electrode of the first transistor M1 is provided with the charging control voltage CTL1. A second electrode of the first transistor M1 is coupled to a charging voltage end REGN.

In one example, when the PWM signal is at a low level, the lower power transistor LS is turned on and the upper power transistor HS is turned off, and the charging control voltage CTL1 is set to a voltage at the first node SW. At this time, the voltage at the first node SW is pulled down to the ground, so that the voltage of the bootstrap node BTST is pulled down and the first transistor M1 is turned on. The bootstrap capacitor Cost is charged by the voltage from the charging voltage end REGN. When the PWM signal is inverted to a high level, the upper power transistor HS is turned on and the lower power transistor LS is turned off, and the charging control voltage CTL1 is set to a voltage at the first electrode of the first transistor M1. The voltage at the first node SW is pulled up to the input voltage VIN or the output voltage VO (depending on whether the DC-DC converter 100 is BUCK or BOOST). The voltage of the bootstrap node BTST rises accordingly. At this time, the first transistor M1 is turned off to prevent the bootstrap node BTST from discharging to the charging voltage end REGN through the first transistor M1. The above description ignores the delay of each stage of the circuit. The inventor of the present disclosure has found that: in a case of a delay in actual applications, when the PWM signal is inverted to the high level, the upper power transistor HS may be turned on and the lower power transistor LS may be turned off, and the first transistor M1 is still not turned off when the voltage of the bootstrap node BTST begins to rise, which may cause the bootstrap node BTST to discharge reversely to the charging voltage end REGN. The charging voltage end REGN is usually an output end of a Low Dropout Regulator (LDO) inside a chip using the DC-DC converter 100. If the bootstrap node BTST discharges reversely to the charging voltage end REGN, the normal operation of the chip may be affected.

In order to prevent the bootstrap node BTST from discharging reversely to the charging voltage end REGN, the embodiments of the present disclosure provide a DC-DC converter that allows the upper power transistor HS to be turned on and the lower power transistor LS to be turned off after the first transistor M1 is completely turned off.

Figure 2:
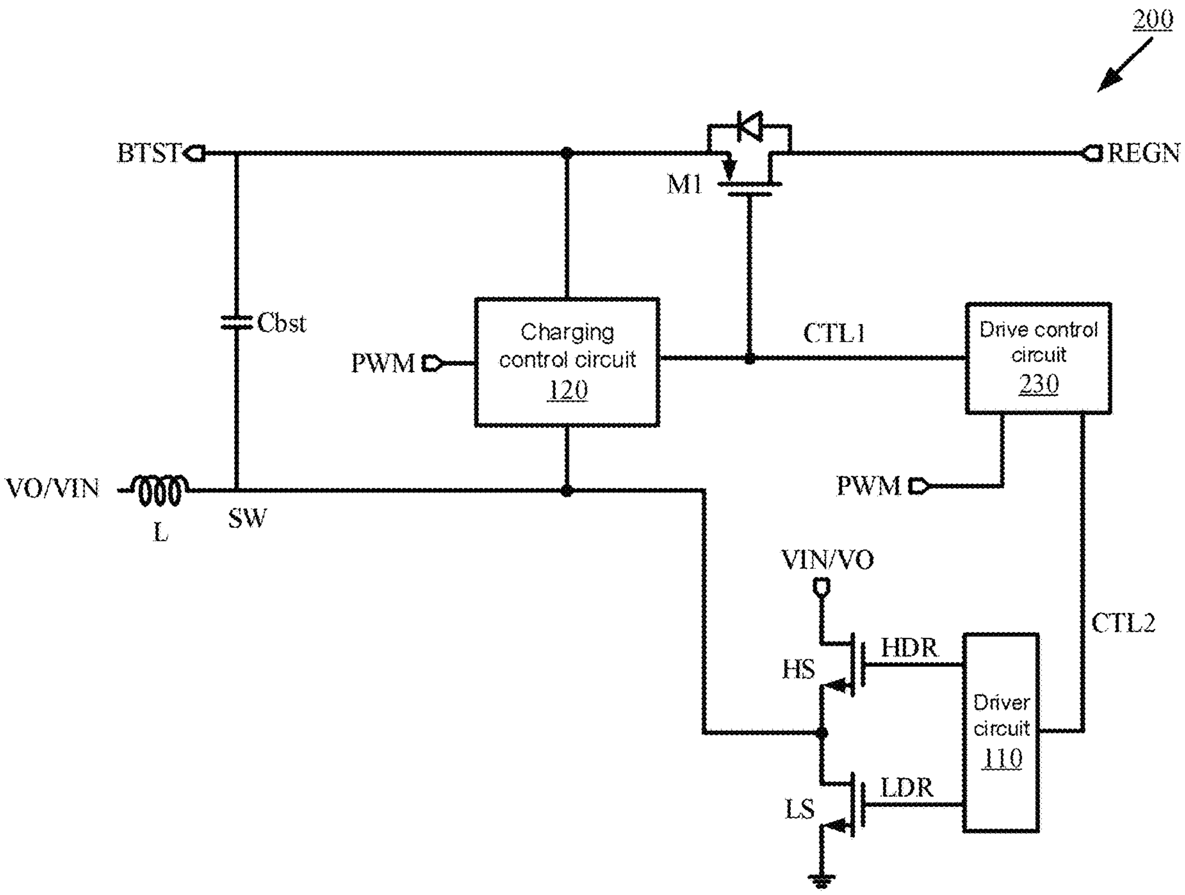
FIG. 2 is a schematic block diagram of a DC-DC converter according to an embodiment of the present disclosure.

FIG. 2 shows a schematic block diagram of a DC-DC converter 200 according to an embodiment of the present disclosure. The DC-DC converter 200 includes an upper power transistor HS, a lower power transistor LS, an inductor L, a bootstrap capacitor Cbst, a first transistor M1, a charging control circuit 120, a drive control circuit 230, and a driver circuit 110. A body diode of the first transistor M1 is also shown in an example of FIG. 2. In order to avoid unimportant details from blurring the focus of the present disclosure, all components in the DC-DC converter 200 are not shown in FIG. 2. In the example of FIG. 2, both the upper power transistor HS and the lower power transistor LS are NMOS transistors. The first transistor M1 is a PMOS transistor.

An input end of the driver circuit 110 is coupled to an output end of the drive control circuit 230. A first output end of the driver circuit 110 is coupled to a control electrode of the upper power transistor HS. A second output end of the driver circuit 110 is coupled to a control electrode of the lower power transistor LS. The driver circuit 110 is configured to generate an upper transistor on signal HDR and a lower transistor on signal LDR according to a drive control signal CTL2 output by the drive control circuit 230. When the drive control signal CTL2 is at a first level, the upper transistor on signal HDR is at an active level and the lower transistor on signal LDR is at an inactive level. When the drive control signal CTL2 is at a second level, the upper transistor on signal HDR is at the inactive level and the lower transistor on signal LDR is at the active level.

The driver circuit 110 provides the upper transistor on signal HDR for the control electrode of the upper power transistor HS from the first output end. The driver circuit 110 provides the lower transistor on signal LDR for the control electrode of the lower power transistor LS from the second output end. A first electrode of the upper power transistor HS is coupled to a second electrode of the lower power transistor LS and a first end of the inductor L through a first node SW. A first electrode of the lower power transistor LS is grounded. A second electrode of the upper power transistor HS is coupled to one of an input voltage end VIN and an output voltage end VO. A second end of the inductor L is coupled to the other of the input voltage end VIN and the output voltage end VO. In an example where the second electrode of the upper power transistor HS is coupled to the input voltage end VIN and the second end of the inductor L is coupled to the output voltage end VO, the DC-DC converter 200 is a buck converter. In an example where the second electrode of the upper power transistor HS is coupled to the output voltage end VO and the second end of the inductor L is coupled to the input voltage end VIN, the DC-DC converter 200 is a boost converter.

Both ends of the bootstrap capacitor Cost are respectively coupled to the first node SW and a first electrode (bootstrap node BTST) of the first transistor M1.

The charging control circuit 120 is coupled to the first node SW, the first electrode (bootstrap node BTST) of the first transistor M1, and a control electrode of the first transistor M1. The power-charging control circuit 120 is further provided with a PWM signal. The charging control circuit 120 is configured to generate a charging control voltage CTL1 according to the PWM signal. When the PWM signal is at the first level, the charging control voltage CTL1 is set to a voltage at the first electrode of the first transistor M1, and when the PWM signal is at the second level, the charging control voltage CTL1 is set to a voltage at the first node SW.

The control electrode of the first transistor M1 is provided with the charging control voltage CTL1. A second electrode of the first transistor M1 is coupled to a charging voltage end REGN. The charging voltage end REGN may be an output end of an LDO inside a chip using the DC-DC converter 200.

A first input end of the drive control circuit 230 is coupled to the control electrode of the first transistor M1. A second input end of the drive control circuit 230 is provided with the PWM signal. An output end of the drive control circuit 230 is coupled to an input end of the driver circuit 110. The drive control circuit 230 is configured to determine an on-off state of the first transistor M1 according to the charging control voltage CTL1, and cause the drive control signal CTL2 to be at the first level in a case where the PWM signal is at the first level and the first transistor M1 is completely turned off, otherwise cause the drive control signal CTL2 to be at the second level. In some embodiments of the present disclosure, the first level is a high level and the second level is a low level. In some embodiments of the present disclosure, the drive control circuit 230 further determines the on-off state of the first transistor M1 according to a threshold voltage of the first transistor M1 (that is, according to the charging control voltage CTL1 and the threshold voltage of the first transistor M1). The on-off state of the first transistor M1 may include a completely turned off state and an incompletely turned off state.

When the PWM signal is at the second level (low level), the charging control circuit 120 causes the charging control voltage CTL1 to be set to the voltage at the first node SW, and the drive control circuit 230 causes the drive control signal CTL2 to be at the second level (low level). At this time, the lower power transistor LS is turned on and the upper power transistor HS is turned off. The voltage at the first node SW is pulled down to the ground, so that the voltage of the bootstrap node BTST is pulled down and the first transistor M1 is turned on. An upper plate (bootstrap node BTST) of the bootstrap capacitor Cost is charged by the voltage from the charging voltage end REGN.

When the PWM signal is inverted to the first level (high level), the charging control circuit 120 causes the charging control voltage CTL1 to be set to the voltage at the first electrode of the first transistor M1. There is a delay inside the charging control circuit 120, so that the charging control voltage CTL1 gradually rises. After the charging control voltage CTL1 rises to cause a gate-source voltage of the first transistor M1 to be higher than a threshold voltage (an absolute value of the gate-source voltage of the first transistor M1 is lower than an absolute value of the threshold voltage), the first transistor M1 is completely turned off. At this time, the drive control circuit 230 causes the drive control signal CTL2 to be inverted to the first level (high level). Therefore, the upper power transistor HS is turned on and the lower power transistor LS is turned off. The voltage at the first node SW is pulled up to the input voltage VIN or the output voltage VO (depending on whether the DC-DC converter 100 is BUCK or BOOST). The voltage of the bootstrap node BTST rises accordingly. Since the first transistor M1 is turned off before the upper power transistor HS is turned on, and the body diode of the first transistor M1 is not turned on in this case, the bootstrap node BTST may be effectively prevented from discharging to the charging voltage end REGN through the first transistor M1.

The DC-DC converter 200 according to the embodiments of the present disclosure ensures that the upper power transistor HS is allowed to be turned on and the lower power transistor LS is turned off after the first transistor M1 is completely turned off by arranging the drive control circuit 230, which may effectively prevent the bootstrap node BTST from discharging to the charging voltage end REGN through the first transistor M1.

Figure 3:
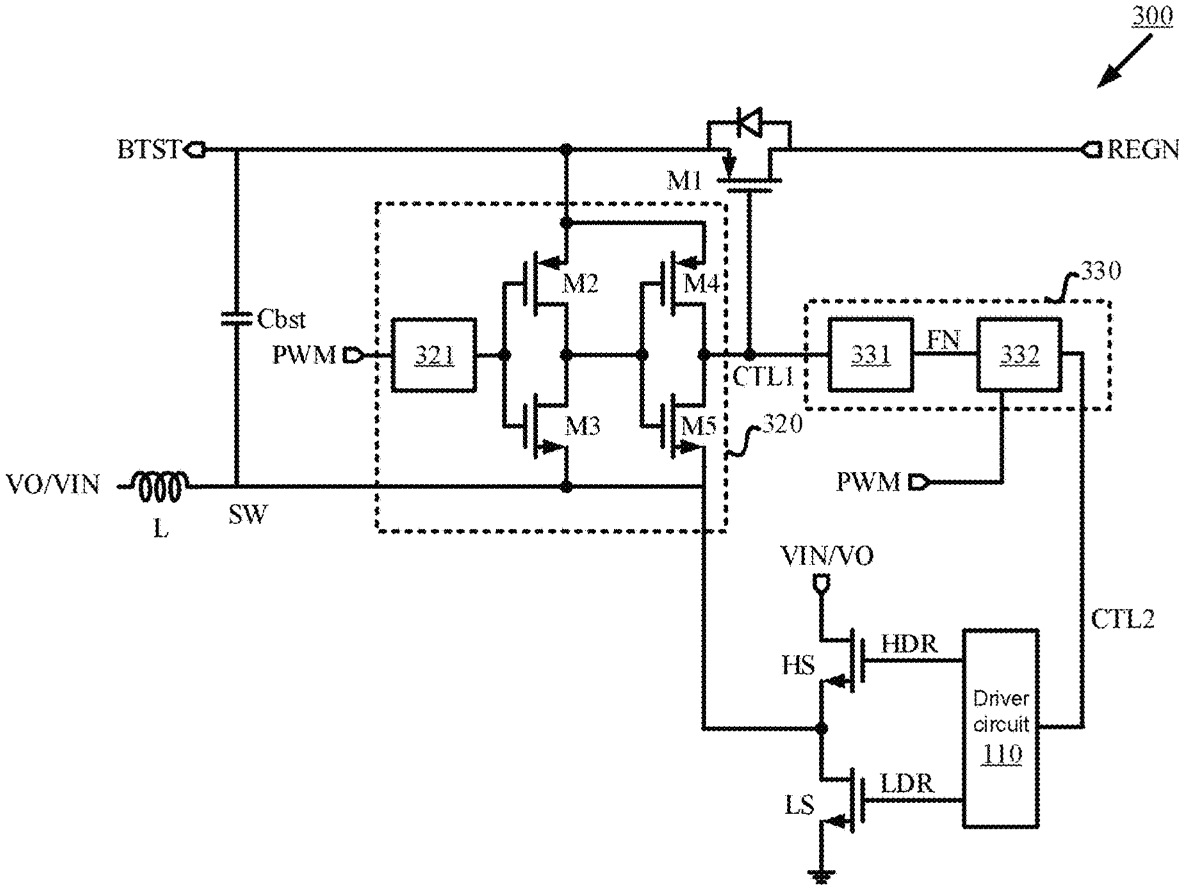
FIG. 3 is an exemplary circuit diagram of a DC-DC converter according to an embodiment of the present disclosure.

FIG. 3 shows an exemplary circuit diagram of a DC-DC converter 300 according to an embodiment of the present disclosure. In an example of FIG. 3, a drive control circuit 330 includes a turn-off determination circuit 331 and a control signal output circuit 332.

An input end of the turn-off determination circuit 331 is coupled to a control electrode of a first transistor M1. An output end of the turn-off determination circuit 331 is coupled to a first input end of the control signal output circuit 332. The turn-off determination circuit 331 is configured to output a turn-off indication signal FN at an active level when a charging control voltage CTL1 is greater than or equal to a reference voltage, otherwise output the turn-off indication signal FN at an inactive level. The active level of the turn-off indication signal FN indicates that the first transistor M1 is completely turned off. The reference voltage is set according to a threshold voltage of the first transistor M1. In some embodiments of the present disclosure, a difference between the reference voltage and a voltage of a charging voltage end REGN is greater than or equal to the threshold voltage of the first transistor M1.

The first input end of the control signal output circuit 332 is coupled to the output end of the turn-off determination circuit 331. A second input end of the control signal output circuit 332 is provided with a PWM signal. An output end of the control signal output circuit 332 is coupled to an input end of a driver circuit 110. The control signal output circuit 332 is configured to output a drive control signal CTL2 at a first level when the PWM signal is at the first level and the turn-off indication signal FN is at the active level, otherwise output the drive control signal CTL2 at a second level.

A charging control circuit 320 may include a second level conversion circuit 321 and a second transistor M2 to a fifth transistor M5. The second level conversion circuit 321 is configured to convert the first level of the PWM signal to a fifth level, and convert the second level of the PWM signal to a sixth level. A control electrode of the second transistor M2 is coupled to a control electrode of the third transistor M3 and an output end of the second level conversion circuit 321. A first electrode of the second transistor M2 is coupled to the first electrode of the first transistor M1 and a first electrode of the fourth transistor M4. A second electrode of the second transistor M2 is coupled to a second electrode of the third transistor M3, a control electrode of the fourth transistor M4, and a control electrode of the fifth transistor M5. A first electrode of the third transistor M3 is coupled to a first node SW and a first electrode of the fifth transistor M5. A second electrode of the fourth transistor M4 is coupled to a second electrode of the fifth transistor M5 and the control electrode of the first transistor M1. In some embodiments of the present disclosure, the fifth level is a level that causes the third transistor M3 to be fully turned on. The sixth level is a level that causes the second transistor M2 to be fully turned on.

In the example of FIG. 3, the first transistor M1, the second transistor M2, and the fourth transistor M4 are PMOS transistors. An upper power transistor HS, a lower power transistor LS, the third transistor M3, and the fifth transistor M5 are NMOS transistors. It should be understood by those skilled in the art that variations of the circuit shown in FIG. 3 based on the above-mentioned inventive concept should also fall within the scope of protection of the present disclosure. In this variation, the above-mentioned transistors and voltage ends may also have different settings from the example shown in FIG. 3.

When the PWM signal is at the second level (low level), the second transistor M2 and the fifth transistor M5 are turned on, the third transistor M3 and the fourth transistor M4 are turned off, the charging control voltage CTL1 is set to a voltage at the first node SW, and the turn-off determination circuit 331 outputs the turn-off indication signal FN at the inactive level, so that the control signal output circuit 332 outputs the drive control signal CTL2 at the second level (low level). At this time, the lower power transistor LS is turned on and the upper power transistor HS is turned off. The voltage at the first node SW is pulled down to the ground, so that a voltage of a bootstrap node BTST is pulled down and the first transistor M1 is turned on. An upper plate (bootstrap node BTST) of a bootstrap capacitor Cbst is charged by the voltage from the charging voltage end REGN.

When the PWM signal is inverted to the first level (high level), the second transistor M2 and the fifth transistor M5 are turned off, the third transistor M3 and the fourth transistor M4 are turned on, and the charging control voltage CTL1 is set to a voltage at the first electrode of the first transistor M1. The charging control voltage CTL1 gradually rises. After the charging control voltage CTL1 rises to cause a gate-source voltage of the first transistor M1 to be higher than the threshold voltage, the first transistor M1 is completely turned off. At this time, the turn-off determination circuit 331 outputs the turn-off indication signal FN at the active level, and the drive control signal CTL2 output by the control signal output circuit 332 is inverted to the first level (high level). Therefore, the upper power transistor HS is turned on and the lower power transistor LS is turned off. The voltage at the first node SW is pulled up to an input voltage VIN or an output voltage VO (depending on whether the DC-DC converter 100 is BUCK or BOOST). The voltage of the bootstrap node BTST rises accordingly. Since the first transistor M1 is turned off before the upper power transistor HS is turned on, and a body diode of the first transistor M1 is not turned on in this case, the bootstrap node BTST may be effectively prevented from discharging to the charging voltage end REGN through the first transistor M1.

Figure 4:
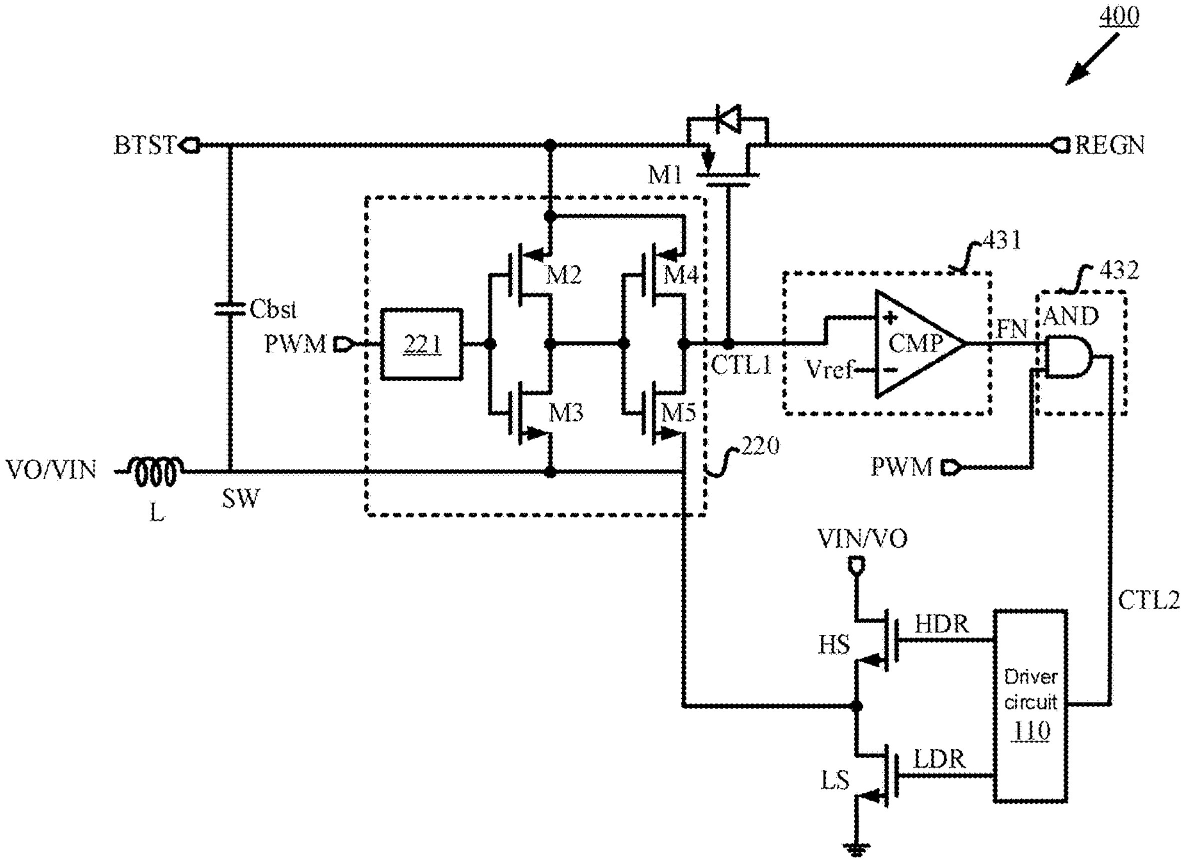
FIG. 4 is another exemplary circuit diagram of a DC-DC converter according to an embodiment of the present disclosure.

FIG. 4 shows an exemplary circuit diagram of a DC-DC converter 400 according to an embodiment of the present disclosure. In an example of FIG. 4, a turn-off determination circuit 431 may include a voltage comparator CMP. A first input end of the voltage comparator CMP is coupled to a control electrode of a first transistor M1. A second input end of the voltage comparator CMP is coupled to a reference voltage end Vref. A reference voltage Vref is output from the reference voltage end Vref. An output end of the voltage comparator CMP is coupled to a control signal output circuit 432. As above, in some embodiments of the present disclosure, a difference between the reference voltage Vref and a voltage of a charging voltage end REGN is greater than or equal to a threshold voltage of the first transistor M1.

The control signal output circuit 432 includes an AND gate AND. A first input end of the AND gate AND is provided with a turn-off indication signal FN (coupled to the output end of the voltage comparator CMP). A second input end of the AND gate AND is provided with a PWM signal. A drive control signal CTL2 is output from an output end of the AND gate AND.

In the example of FIG. 4, the first input end of the voltage comparator CMP is a non-inverting input end. The second input end of the voltage comparator CMP is an inverting input end. It should be understood by those skilled in the art that variations of the circuit shown in FIG. 4 based on the above-mentioned inventive concept should also fall within the scope of protection of the present disclosure. In this variation, the above-mentioned transistors and voltage ends may also have different settings from the example shown in FIG. 4.

When the PWM signal is at a second level (low level), a second transistor M2 and a fifth transistor M5 are turned on, a third transistor M3 and a fourth transistor M4 are turned off, and a charging control voltage CTL1 is set to a voltage at a first node SW. Since the second input end of the AND gate AND is provided with the second level (low level), the drive control signal CTL2 output by the AND gate AND is at the second level (low level). At this time, a lower power transistor LS is turned on and an upper power transistor HS is turned off. The voltage at the first node SW is pulled down to the ground, so that a voltage of a bootstrap node BTST is pulled down and the first transistor M1 is turned on. An upper plate (bootstrap node BTST) of a bootstrap capacitor Cost is charged by the voltage from the charging voltage end REGN. At this time, the charging control voltage CTL1 is at the low level (lower than the reference voltage Vref), so that the turn-off indication signal FN output by the voltage comparator CMP is at an inactive level (low level).

When the PWM signal is inverted to a first level (high level), the second transistor M2 and the fifth transistor M5 are turned off, the third transistor M3 and the fourth transistor M4 are turned on, and the charging control voltage CTL1 is set to a voltage at a first electrode of the first transistor M1. The charging control voltage CTL1 gradually rises. After the charging control voltage CTL1 rises to the reference voltage Vref to cause a gate-source voltage of the first transistor M1 to be higher than the threshold voltage, the first transistor M1 is completely turned off. At this time, the turn-off indication signal FN output by the voltage comparator CMP is inverted from the inactive level (low level) to an active level (high level). Both input ends of the AND gate AND are provided with the first level (high level), so that the drive control signal CTL2 output by the AND gate AND is inverted to the first level (high level). The upper power transistor HS is turned on and the lower power transistor LS is turned off. The voltage at the first node SW is pulled up to an input voltage VIN or an output voltage VO (depending on whether the DC-DC converter 100 is BUCK or BOOST). The voltage of the bootstrap node BTST rises accordingly. Since the first transistor M1 is turned off before the upper power transistor HS is turned on, and a body diode of the first transistor M1 is not turned on in this case, the bootstrap node BTST may be effectively prevented from discharging to the charging voltage end REGN through the first transistor M1.

Figure 5:
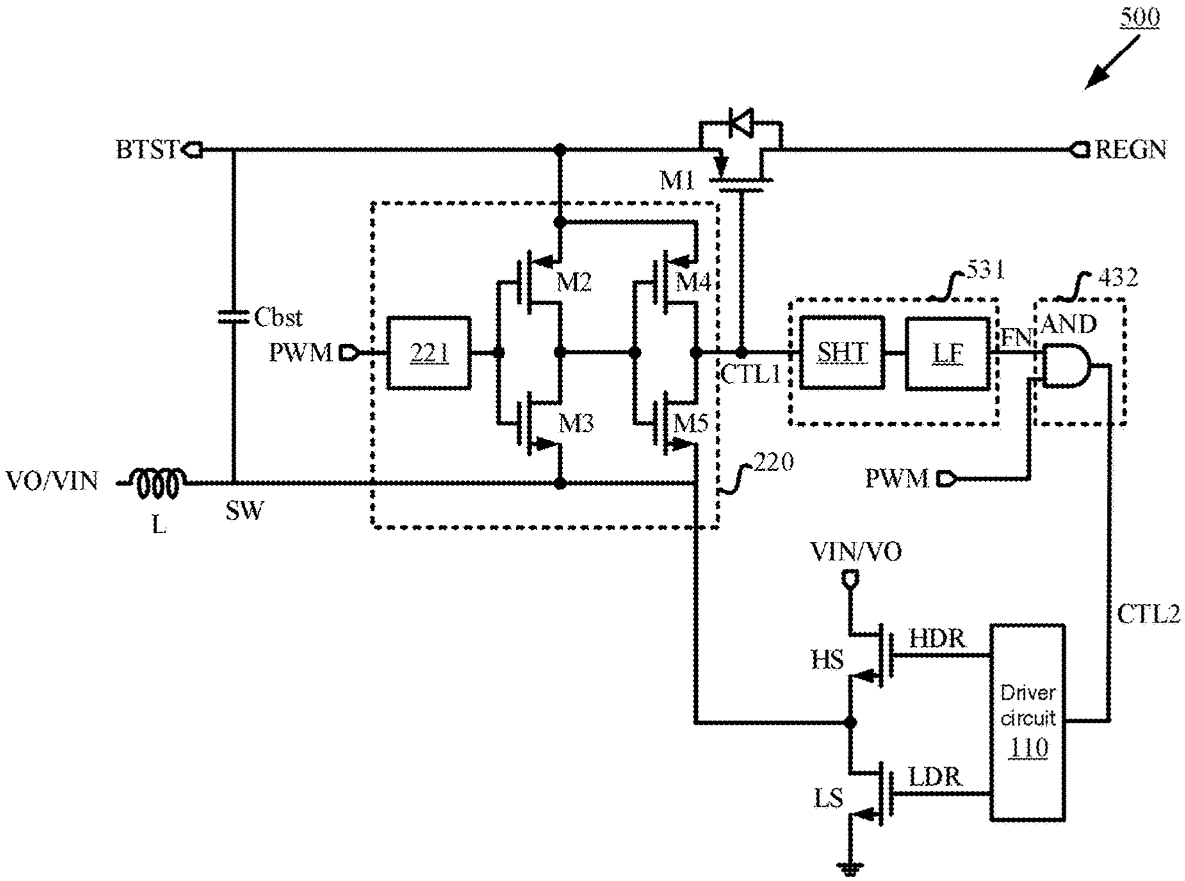
FIG. 5 is still another exemplary circuit diagram of a DC-DC converter according to an embodiment of the present disclosure.

FIG. 5 shows an exemplary circuit diagram of a DC-DC converter 500 according to an embodiment of the present disclosure. In an example of FIG. 5, a turn-off determination circuit 531 may include a Schmitt trigger SHT and a first level conversion circuit LF. An input end of the Schmitt trigger SHT is coupled to a control electrode of a first transistor M1. An output end of the Schmitt trigger SHT is coupled to an input end of the first level conversion circuit LF. An upper threshold of the Schmitt trigger SHT is set to a reference voltage. As above, in some embodiments of the present disclosure, a difference between the reference voltage and a voltage of a charging voltage end REGN is greater than or equal to a threshold voltage of the first transistor M1. The Schmitt trigger SHT is configured to generate a trigger signal according to a charging control voltage CTL1. The trigger signal is inverted to a third level when the charging control voltage CTL1 rises to the reference voltage, and is inverted to a fourth level when the charging control voltage CTL1 drops to a lower threshold. The lower threshold is lower than the reference voltage. In actual application scenarios, the third level of the trigger signal may not be correctly identified as a high level by an AND gate AND, or the fourth level of the trigger signal may not be correctly identified as a low level by the AND gate AND. Therefore, the first level conversion circuit LF is further provided.

The first level conversion circuit LF is configured to generate a turn-off indication signal FN according to the trigger signal. The third level of the trigger signal is converted to an active level of the turn-off indication signal FN, and the fourth level of the trigger signal is converted to an inactive level of the turn-off indication signal FN.

The use of the Schmitt trigger SHT in the turn-off determination circuit 531 may prevent the turn-off indication signal FN from being erroneously inverted due to fluctuations in the charging control voltage CTL1.

When a PWM signal is at a second level (low level), a second transistor M2 and a fifth transistor M5 are turned on, a third transistor M3 and a fourth transistor M4 are turned off, and the charging control voltage CTL1 is set to a voltage at a first node SW. Since a second input end of the AND gate AND is provided with the second level (low level), a drive control signal CTL2 output by the AND gate AND is at the second level (low level). At this time, a lower power transistor LS is turned on and an upper power transistor HS is turned off. The voltage at the first node SW is pulled down to the ground, so that a voltage of a bootstrap node BTST is pulled down and the first transistor M1 is turned on. An upper plate (bootstrap node BTST) of a bootstrap capacitor Cost is charged by the voltage from the charging voltage end REGN. At this time, the charging control voltage CTL1 is at the low level (lower than the reference voltage Vref), so that the trigger signal output by the Schmitt trigger SHT is at the fourth level, and the first level conversion circuit LF converts the fourth level of the trigger signal into the inactive level (low level) of the turn-off indication signal FN.

When the PWM signal is inverted to a first level (high level), the second transistor M2 and the fifth transistor M5 are turned off, the third transistor M3 and the fourth transistor M4 are turned on, and the charging control voltage CTL1 is set to a voltage at a first electrode of the first transistor M1. The charging control voltage CTL1 gradually rises. After the charging control voltage CTL1 rises to the reference voltage Vref to cause a gate-source voltage of the first transistor M1 to be higher than the threshold voltage, the first transistor M1 is completely turned off. At this time, the trigger signal output by the Schmitt trigger SHT is inverted from the fourth level to the third level, and the first level conversion circuit LF converts the third level of the trigger signal to the active level (high level) of the turn-off indication signal FN. Both input ends of the AND gate AND are provided with the first level (high level), so that the drive control signal CTL2 output by the AND gate AND is inverted to the first level (high level). The upper power transistor HS is turned on and the lower power transistor LS is turned off. The voltage at the first node SW is pulled up to an input voltage VIN or an output voltage VO (depending on whether the DC-DC converter 100 is BUCK or BOOST). The voltage of the bootstrap node BTST rises accordingly. Since the first transistor M1 is turned off before the upper power transistor HS is turned on, and a body diode of the first transistor M1 is not turned on in this case, the bootstrap node BTST may be effectively prevented from discharging to the charging voltage end REGN through the first transistor M1.

The embodiments of the present disclosure further provide a chip. The chip includes the DC-DC converter according to the embodiments of the present disclosure. The chip is, for example, a power management chip.

The embodiments of the present disclosure further provide an electronic device. The electronic device includes the chip according to the embodiments of the present disclosure. The electronic device is, for example, an intelligent terminal device, such as a tablet computer, a smart phone, etc.

In summary, the DC-DC converter according to the embodiments of the present disclosure can ensure that the upper power transistor HS is allowed to be turned on and the lower power transistor LS is turned off after the first transistor M1 is completely turned off, which may effectively prevent the bootstrap node BTST from discharging to the charging voltage end REGN through the first transistor M1, thereby protecting the chip using the DC-DC converter.

Unless otherwise indicated clearly in the context, the singular form of terms used herein and in the appended claims includes the plural, and vice versa. Therefore, when referring to the singular, it usually includes the plural of the corresponding term. Similarly, the words "include" and "comprise" will be interpreted as inclusive rather than exclusive. Similarly, the terms "include" and "or" shall be interpreted as including, unless such interpretation is expressly prohibited herein. Where the term "example" is used herein, particularly when it is behind a group of terms, the "example" is only exemplary and illustrative, and should not be considered exclusive or extensive.

Further aspects and scope of adaptability become apparent from the description provided herein. It is to be understood that various aspects of the present disclosure may be implemented separately or in combination with one or more other aspects. It is also to be understood that the description and specific embodiments herein are for illustrative purposes only and are not intended to limit the scope of the present disclosure.

Several embodiments of the present disclosure have been described in detail above. However, apparently, those skilled in the art can make various modifications and variants to the embodiments of the present disclosure without departing from the spirit and scope of the present disclosure. The scope of the present disclosure is limited by the appended claims.

What is claimed is:

1. A Direct Current (DC)-DC converter, comprising an upper power transistor, a lower power transistor, an inductor, a bootstrap capacitor, a first transistor, a charging control circuit, a drive control circuit, and a driver circuit, wherein the driver circuit is configured to generate an upper transistor on signal and a lower transistor on signal according to a drive control signal output by the drive control circuit, wherein when the drive control signal is at a first level, the upper transistor on signal is at an active level and the lower transistor on signal is at an inactive level, and when the drive control signal is at a second level, the upper transistor on signal is at the inactive level and the lower transistor on signal is at the active level;

a control electrode of the upper power transistor is provided with the upper transistor on signal, a control electrode of the lower power transistor is provided with the lower transistor on signal, and a first electrode of the upper power transistor is coupled to a second electrode of the lower power transistor and a first end of the inductor through a first node;

the bootstrap capacitor comprises a first end coupled to the first node and a second end coupled to a first electrode of the first transistor;

the charging control circuit is configured to generate a charging control voltage according to a Pulse Width Modulation (PWM) signal, wherein when the PWM signal is at the first level, the charging control voltage is set to a voltage at the first electrode of the first transistor, and when the PWM signal is at the second level, the charging control voltage is set to a voltage at the first node;

a control electrode of the first transistor is provided with the charging control voltage, and a second electrode of the first transistor is coupled to a charging voltage end;

the drive control circuit is configured to determine an on-off state of the first transistor according to the charging control voltage, and cause the drive control signal to be at the first level in a case where the PWM signal is at the first level and the first transistor is completely turned off, otherwise cause the drive control signal to be at the second level; and the drive control circuit comprises a turn-off determination circuit and a control signal output circuit, wherein the turn-off determination circuit is configured to output a turn-off indication signal at the active level when the charging control voltage is greater than or equal to a reference voltage, otherwise output the turn-off indication signal at the inactive level, wherein the active level of the turn-off indication signal indicates that the first transistor is completely turned off, and the reference voltage is set according to a threshold voltage of the first transistor, and the control signal output circuit is configured to output the drive control signal at the first level when the PWM signal is at the first level and the turn-off indication signal is at the active level, otherwise output the drive control signal at the second level.

2. The DC-DC converter as claimed in claim 1, wherein the turn-off determination circuit comprises a voltage comparator, wherein a first input end of the voltage comparator is coupled to the control electrode of the first transistor, a second input end of the voltage comparator is coupled to a reference voltage end, the reference voltage is output from the reference voltage end, and an output end of the voltage comparator is coupled to the control signal output circuit.

3. The DC-DC converter as claimed in claim 1, wherein the turn-off determination circuit comprises a Schmitt trigger and a first level conversion circuit, wherein an upper threshold of the Schmitt trigger is set to the reference voltage, the Schmitt trigger is configured to generate a trigger signal according to the charging control voltage, wherein the trigger signal is inverted to a third level when the charging control voltage rises to the reference voltage, and is inverted to a fourth level when the charging control voltage drops to a lower threshold, and the lower threshold is lower than the reference voltage; and the first level conversion circuit is configured to generate the turn-off indication signal according to the trigger signal, wherein the third level of the trigger signal is converted to the active level of the turn-off indication signal, and the fourth level of the trigger signal is converted to the inactive level of the turn-off indication signal.

4. The DC-DC converter as claimed in claim 1, wherein the control signal output circuit comprises an AND gate, wherein a first input end of the AND gate is provided with the turn-off indication signal, a second input end of the AND gate is provided with the PWM signal, and the drive control signal is output from an output end of the AND gate.

5. The DC-DC converter as claimed in claim 1, wherein the charging control circuit comprises a second level conversion circuit, a second transistor, a third transistor, a fourth transistor and a fifth transistor, wherein the second level conversion circuit is configured to convert the first level of the PWM signal to a fifth level, and convert the second level of the PWM signal to a sixth level;

a control electrode of the second transistor is coupled to a control electrode of the third transistor and an output end of the second level conversion circuit, a first electrode of the second transistor is coupled to the first electrode of the first transistor and a first electrode of the fourth transistor, and a second electrode of the second transistor is coupled to a second electrode of the third transistor, a control electrode of the fourth transistor, and a control electrode of the fifth transistor;

a first electrode of the third transistor is coupled to the first node and a first electrode of the fifth transistor; and a second electrode of the fourth transistor is coupled to a second electrode of the fifth transistor and the control electrode of the first transistor.

6. The DC-DC converter as claimed in claim 1, wherein both the upper power transistor and the lower power transistor are N-channel Metal Oxide Semiconductor (NMOS) transistors.

7. The DC-DC converter as claimed in claim 1, wherein the first transistor is a P-channel Metal Oxide Semiconductor (PMOS) transistor.

8. The DC-DC converter as claimed in claim 1, wherein a second electrode of the upper power transistor is coupled to one of an input voltage end and an output voltage end, and a second end of the inductor is coupled to the other of the input voltage end and the output voltage end.

9. The DC-DC converter as claimed in claim 8, wherein, when the second electrode of the upper power transistor is coupled to the input voltage end and the second end of the inductor is coupled to the output voltage end, the DC-DC converter is a buck converter; and when the second electrode of the upper power transistor is coupled to the output voltage end and the second end of the inductor is coupled to the input voltage end, the DC-DC converter is a boost converter.

10. The DC-DC converter as claimed in claim 1, wherein an input end of the driver circuit is coupled to an output end of the drive control circuit, a first output end of the driver circuit is coupled to the control electrode of the upper power transistor, and a second output end of the driver circuit is coupled to the control electrode of the lower power transistor; and the driver circuit provides the upper transistor on signal for the control electrode of the upper power transistor from the first output end, and the driver circuit provides the lower transistor on signal for the control electrode of the lower power transistor from the second output end.

11. The DC-DC converter as claimed in claim 1, wherein the charging control circuit is coupled to the first node, the first electrode of the first transistor, and the control electrode of the first transistor.

12. The DC-DC converter as claimed in claim 1, wherein a first input end of the drive control circuit is coupled to the control electrode of the first transistor, a second input end of the drive control circuit is provided with the PWM signal, and an output end of the drive control circuit is coupled to an input end of the driver circuit.

13. The DC-DC converter as claimed in claim 1, wherein an input end of the turn-off determination circuit is coupled to the control electrode of the first transistor, and an output end of the turn-off determination circuit is coupled to a first input end of the control signal output circuit; and a second input end of the control signal output circuit is provided with the PWM signal, and an output end of the control signal output circuit is coupled to an input end of the driver circuit.

14. A chip, comprising the Direct Current (DC)-DC converter as claimed in claim 1.

15. A Direct Current (DC)-DC converter, comprising an upper power transistor, a lower power transistor, an inductor, a bootstrap capacitor, a first transistor, a second transistor, a third transistor, a fourth transistor, a fifth transistor, a Schmitt trigger, a first level conversion circuit, a second level conversion circuit, an AND gate, and a driver circuit, wherein the driver circuit is configured to generate an upper transistor on signal and a lower transistor on signal according to a drive control signal output by an output end of the AND gate, wherein when the drive control signal is at a first level, the upper transistor on signal is at an active level and the lower transistor on signal is at an inactive level, and when the drive control signal is at a second level, the upper transistor on signal is at the inactive level and the lower transistor on signal is at the active level;

a control electrode of the upper power transistor is provided with the upper transistor on signal, a control electrode of the lower power transistor is provided with the lower transistor on signal, and a first electrode of the upper power transistor is coupled to a second electrode of the lower power transistor and a first end of the inductor through a first node;

the bootstrap capacitor comprises a first end coupled to the first node and a second end coupled to a first electrode of the first transistor;

the second level conversion circuit is configured to convert the first level of a Pulse Width Modulation (PWM) signal to a fifth level, and convert the second level of the PWM signal to a sixth level;

a control electrode of the second transistor is coupled to a control electrode of the third transistor and an output end of the second level conversion circuit, a first electrode of the second transistor is coupled to the first electrode of the first transistor and a first electrode of the fourth transistor, and a second electrode of the second transistor is coupled to a second electrode of the third transistor, a control electrode of the fourth transistor, and a control electrode of the fifth transistor;

a first electrode of the third transistor is coupled to the first node and a first electrode of the fifth transistor;

a second electrode of the fourth transistor is coupled to a second electrode of the fifth transistor and a control electrode of the first transistor;

a second electrode of the first transistor is coupled to a charging voltage end;

wherein the Schmitt trigger is configured to generate a trigger signal according to a charging control voltage at the control electrode of the first transistor, wherein the trigger signal is inverted to a third level when the charging control voltage rises to an upper threshold, and is inverted to a fourth level when the charging control voltage drops to a lower threshold, and the lower threshold is lower than the upper threshold;

the first level conversion circuit is configured to generate a turn-off indication signal according to the trigger signal, wherein the third level of the trigger signal is converted to the active level of the turn-off indication signal, and the fourth level of the trigger signal is converted to the inactive level of the turn-off indication signal; and a first input end of the AND gate is provided with the turn-off indication signal, and a second input end of the AND gate is provided with the PWM signal.

16. An electronic device, comprising the chip as claimed in claim 14.

* * * * *